April 27, 1926.  F. TRAPSCHUH  1,582,560
PROCESS OF MANUFACTURING GLASS AND APPARATUS FOR CARRYING ON THIS PROCESS
Filed June 15, 1925
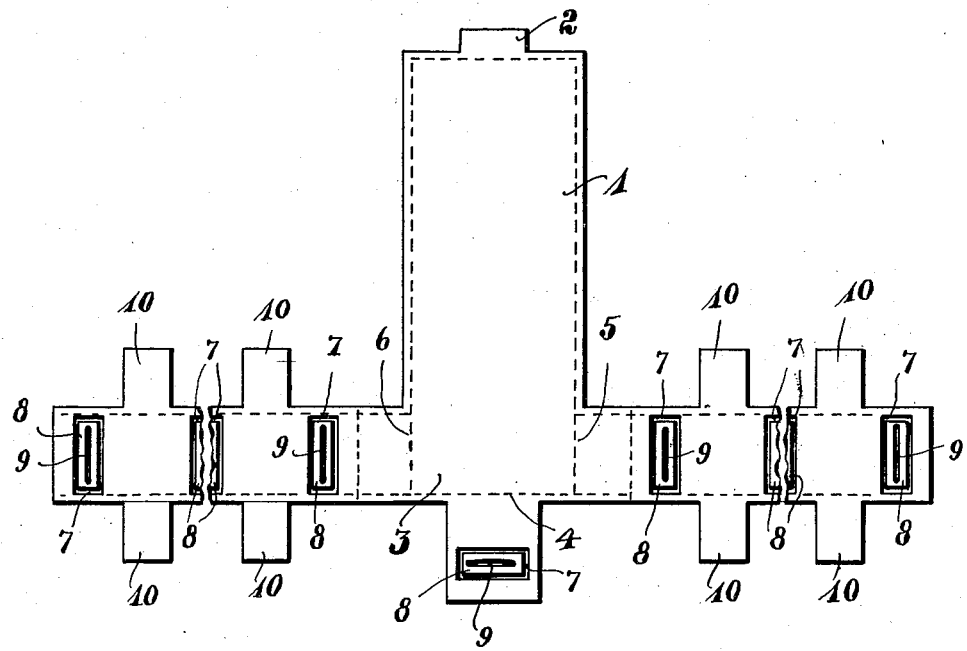
INVENTOR:
FRANZ TRAPSCHUH,
By: Otto H. Krueger,
his Atty.

Patented Apr. 27, 1926.

1,582,560

UNITED STATES PATENT OFFICE.

FRANZ TRAPSCHUH, OF TORRANCE, CALIFORNIA.

PROCESS OF MANUFACTURING GLASS AND APPARATUS FOR CARRYING ON THIS PROCESS.

Application filed June 15, 1925. Serial No. 37,184.

*To all whom it may concern:*

Be it known that I, FRANZ TRAPSCHUH, a citizen of Czechoslovakia, residing at Torrance, in the county of Los Angeles and State of California, have invented a new and useful Process of Manufacturing Glass and Apparatus for Carrying on this Process, of which the following is a specification.

This invention relates to a process of glass-manufacture and an apparatus by which glass can be manufactured according to this process.

One of the objects of this invention is to handle the raw-material economically during the process.

Another object is to arrange the melting and drawing economically by a proper proportioning between the melting and drawing tanks of a furnace.

Another object is to provide for an economical melting and drawing by a proper proportioning of the heating facilities between and during the whole process in the melting and drawing tanks.

Another object is to provide for an economical process by arranging the drawing tanks in proper relation to the melting tanks.

Another object is to provide for an economical process by arranging the drawing tanks in proper relation to the melting tanks, and providing heating facilities at certain points.

Another object is to provide an apparatus by which the process can be applied according to the invention.

Other objects will appear from the following description and appended claims as well as from the accompanying drawing, in which—

The figure is a general top plan view of a glass-furnace of a simple form.

To facilitate a description of the process, a certain apparatus in a certain form has been illustrated in the accompanying drawing, but I wish it understood that I do not limit myself to any particular apparatus as long as the results to be obtained by apparatus as disclosed herewith may be obtained by other modified forms under the process set forth hereafter.

For drawing glass, especially plate-glass, the temperature in the drawing-tanks must be maintained at a certain intensity.

Moreover, since glass must be supplied in a continuous stream to the drawing tank from the melting tank, considering only efficient apparatus, the temperature in the melting tank must be maintained in suitable relation to the temperature in the drawing tank.

An apparatus can, moreover, only be efficient if the drawing tank is designed of suitable proportion in relation to the size of the melting tank, and if the drawing tank in itself is of suitable proportion to the amount of glass to be drawn from it.

The positioning of the drawing tank in relation to the melting tank, that is, the positioning of the glass ready to be drawn in relation to the glass prepared for drawing in the melting tank, is of great importance. The glass near the drawing machinery must not be divided from the bulk of molten material in the melting tank by badly proportioned supplying or connecting channels.

One of the principal features of this invention is therefore to bring the bulk of molten material in the melting tank as close as possible to the drawing machineries. Furthermore, burners are eliminated as far as possible at points between the melting tank and adjoining drawing tanks.

This is accomplished by providing a melting tank of practically equal width. Such a melting tank is indicated at 1 in the drawing. From the starting point or end 2, where the raw-material is fed into the melting tank 1, up to the opposite end 3 of the melting tank, this melting tank is of practically even width, so that a melting progresses from end 2 to the end 3 without any material interference to the flow of the molten glass.

The ends 4, 5 and 6 of adjoining drawing-tanks are in direct communication with the melting tank, so that the molten glass may flow equally well from the melting tank into the several drawing tanks.

Glass-drawing machinery, not shown in the drawing, is normally disposed in suitable relation to the drawing tanks.

In the illustration, the cover-plates have been left off above the drawing openings 7, so that the drawing-floats 8 with the drawing-slots 9 are visible through the top of the drawing-tanks.

Glass-drawing machinery suitably disposed in relation to the slots 9 of the drawing-blocks 8 may be supplied with an even stream of molten glass from the melting tank 1.

The principal burners in the drawing tanks are indicated at 10. Such principal burners include fuel-supplying apparatus and air-supplying apparatus. It is immaterial whether the flames are produced from liquid, gas, or solid fuel-material. The air for such burners is normally preheated or even superheated in suitable channels or retorts before it mixes with the fuel.

Other, auxiliary or secondary flames are provided, but only maintained in a burning state during the preheating of the furnace or raw-material, preparatory to the drawing of the glass. Such auxiliary or secondary burners or flames are therefore not indicated, though they may be at other and various points of the whole structure of the furnace in the melting as well as in the drawing sections of the furnace.

Parts and apparatus, that directly influence, and have a direct co-acting relation to the drawing of the glass and the glass-drawing machines, are illustrated in the drawing.

From the illustration it must be clear that no principal burner is provided or inserted at points between the melting tank and the first glass-drawing machine in any of the drawing-tanks.

Under the arrangement as illustrated, glass is supplied in an even stream from the melting tank 1 to the several machines normally disposed above the several drawing blocks 8 indicated in the illustration.

The temperature of the glass when it is supplied to the several machines is then just right without having to be increased by a further heating through additional burners or to be decreased by having to be passed through spaces between the melting tank and the drawing tanks.

By eliminating the commonly provided narrow neck or passage between the melting tank and the drawing tanks, quite important advantages are obtained in this new structure. The dead corners in the melting tank just before the narrow neck-like passage are entirely eliminated. The increased friction and thereby produced wear of the passing glass on the sides of the narrow passage is also eliminated. The extra principal burners adjacent the melting tank before the drawing tanks are entirely eliminated. A fine product is obtained by the uninterrupted unretarded flow of glass from the melting tank to the several drawing tanks.

Any number of drawing-machines can, of course, be provided, depending entirely on the facilities of the melting tanks and the drawing-tanks.

Having thus described my invention, I claim:

1. The herein described process of drawing glass in flat sheets consisting in melting the raw material, passing the molten material in an even unchecked stream into drawing-tanks, and drawing the molten material from such drawing tanks in flat sheets, one transversely across the head-end of the melting tank and the other flat sheets parallel to the longitudinal axis and direction of movement of the melting body of glass up to points close to the outermost edges of the molten body of glass in the drawing tanks.

2. The herein described process of drawing glass in flat sheets consisting in melting the raw material in a melting tank of practically even width so as to provide a flowing of molten material in an even stream from the charging end to the discharging end in the melting tank, bringing the molten material directly into drawing tanks from the wide discharging end of the melting tank, and drawing glass from the drawing tanks with the first drawing suitably close to the melting tank so as to eliminate additional heating at points between the melting tank and the first drawing machines in flat sheets, one transversely across the head-end of the melting tank and the other flat sheets parallel to the longitudinal axis and direction of movement of the melting body of glass and with the last drawing close to the outermost edge of the body of molten glass.

3. In a glass furnace, a melting tank of practically even width from the charging end to the discharging end, and drawing tanks in direct communication with the wide discharging end of the melting tank the drawing tanks having flat discharging orifices one centrally across the head-end of the melting tank and the others parallel to the longitudinal axis of the melting tank near the head-end of the melting tank, the drawing tanks terminating close to the last orifice in each of the said tanks.

4. In a glass furnace, a melting tank of practically even width from the charging end to the discharging end, and drawing tanks in direct communication with the wide discharging end of the melting tank having one drawing orifice across the discharging end of the melting tank and other drawing orifices sidewise of and parallel to the melting tank close to the discharging end of the melting tank, the drawing tanks terminating close to the last orifice in each of the said tanks.

5. In a glass furnace, a melting tank of practically even width from the charging end to the discharging end, drawing tanks in direct communication with the wide discharging end of the melting tank each having several flat drawing orifices, and burners including fuel- and air- supplying means between the several parallel discharging orifices in the drawing tanks, one drawing tank with its flat drawing orifice being disposed across the discharging end of the melting tank adapted to receive glass from the melting tank without additional burners between the melting tank and this drawing tank.

In testimony that I claim the foregoing as my invention I have signed my name.

FRANZ TRAPSCHUH.